US006491820B2

(12) United States Patent
Held et al.

(10) Patent No.: US 6,491,820 B2
(45) Date of Patent: *Dec. 10, 2002

(54) METHOD FOR THE MOLECULAR DESTRUCTION OF WASTE-ACTIVATED SLUDGE USING HIGH ELECTRICAL VOLTAGE

(75) Inventors: Jeffry Held, Chicago, IL (US); Satya P. Chauhan, Columbus, OH (US)

(73) Assignee: DH20 L.L.C., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/998,651

(22) Filed: Dec. 3, 2001

(65) Prior Publication Data

US 2002/0036175 A1 Mar. 28, 2002

Related U.S. Application Data

(63) Continuation-in-part of application No. 09/612,776, filed on Jul. 10, 2000, now Pat. No. 6,395,176, which is a continuation-in-part of application No. 09/468,427, filed on Dec. 21, 1999, now abandoned, which is a continuation of application No. 09/229,279, filed on Jan. 13, 1999, now Pat. No. 6,030,538, which is a continuation-in-part of application No. 08/934,548, filed on Sep. 22, 1997, now Pat. No. 5,893,979, which is a continuation-in-part of application No. 08/552,226, filed on Nov. 1, 1995, now Pat. No. 5,695,650.

(51) Int. Cl.$^7$ ................................................. C02F 1/461
(52) U.S. Cl. ..................... 210/609; 210/610; 210/622; 210/624; 210/626; 210/748; 205/751; 422/22
(58) Field of Search ................................. 210/606, 610, 210/622, 624, 625, 626, 609, 748, 764, 768, 808, 315, 323.1, 323.2, 497.01, 497.3; 205/751; 422/22

(56) References Cited

U.S. PATENT DOCUMENTS

| | | | | |
|---|---|---|---|---|
| 3,913,500 A | * | 10/1975 | Paccione et al. ............. 110/224 |
| 5,695,650 A | * | 12/1997 | Held ........................... 205/742 |
| 5,846,425 A | * | 12/1998 | Whiteman ................... 210/606 |
| 5,893,979 A | * | 4/1999 | Held ........................... 205/751 |
| 6,030,538 A | * | 2/2000 | Held ........................... 205/751 |

OTHER PUBLICATIONS

Chauhan, Feasibility of Biosludge Dewatering Using Pulsed Electric Fields, Battelle, Sep. 17, 1998, p. 1–24.*

* cited by examiner

Primary Examiner—Peter A. Hruskoci
(74) Attorney, Agent, or Firm—Marvin N. Benn; Milton S. Gerstein

(57) ABSTRACT

The present invention is directed to a pulsed electric-field system for rupturing and destroying molecular cellular units of waste-activated sludge to thereby liberate intracellular water molecules from the solids-content thereof. The waste-activated sludge is contained in waste sludge, such as paper-pulp sludge, municipal waste sludge, animal or plant waste sludge. The pulsed-electric field is generated by an electroporating device producing a non-arcing pulsed electric field. The released intracellular dissolved/organic matter may be recycled back to an aeration tank for supplying food to bacteria of the aeration tank for performing aerobic digestion thereon, whereby the intracellular, dissolved organic matter is used as food for the bacteria of the aeration tank, whereby the aerobic digestion process is accelerated.

5 Claims, 12 Drawing Sheets

METHOD FOR THE MOLECULAR DESTRUCTION OF WASTE-ACTIVATED SLUDGE USING HIGH ELECTRICAL VOLTAGE

CROSS REFERENCE TO RELATED APPLICATION

This is a continuation-in-part of application Ser. No. 09/612,776 filed on Jul. 10, 2000, now U.S. Pat. No. 6,395,176 which is a continuation-in-part of application Ser. No. 09/468,427, filed on Dec. 21, 1999 abandoned, which is a continuation of application Ser. No. 09/229,279, filed on Jan. 13, 1999, now U.S. Pat. No. 6,030,538, which is a continuation-in-part of application Ser. No. 08/934,548, filed on Sep. 22, 1997, now U.S. Pat. No. 5,893,979, which is a continuation-in-part of application Ser. No. 08/552,226, filed on Nov. 1, 1995, now U.S. Pat. No. 5,695,650.

BACKGROUND OF THE INVENTION

The present invention is directed to the discovery that the majority of the water contained in municipal waste-water sludge treated by the municipal treatment plants is contained within and between molecular cells. The water molecules contained within the cell, for purposes of this application, shall be referred to as "intra-cellular", water molecules, while the water molecules between the cells and bound thereat via both mechanical and electrical bonding shall be referred to as "intercellular" water molecules. It has been the discovery that this intra-cellular and intercellular water makes up the majority of the water in municipal waste-water sludge treated at a municipal treatment plant, which intra-cellular and intercellular water is not typically released by conventional, municipal dewatering methods which process the municipal sludge.

The present invention, also, relates to a system, apparatus and method directed to the safe and effective treatment of biologically-active, municipal waste-water sludges, and more, particularly, to a pulsed, electric-field apparatus and related method for the disinfecting of municipal waste-water sludges in an efficient and effective manner at the level of the individual, molecular cells of the waste material, so as to substantially reduce the resulting volume and weight of the waste material which has to be disposed of by the municipality.

Presently, for all municipal waste-water sewage material, or sludge, treatment of the waste-water sludge by the municipality is done in accordance with applicable rules and regulations. However, there remains a residual bio-solids waste material which contains a significant amount of water that has to be eventually disposed of by the municipality in an environmentally-safe manner. Prior to disposing of this bio-solids waste material, the municipality will attempt to dewater this bio-solids waste material to the maximum extent possible, in order to reduce its disposal cost and any environmental impact. Conventional dewatering techniques that are utilized by the municipal wastewater treatment plants are commonly referred to as (i) a "belt filter" type press, which is a system of multiple rollers and mesh belts through which the bio-solids waste material is caused to travel between, and which cooperate to squeeze some of the water from the bio-solids waste material; or (ii) a dedicated, inline, centrifuge apparatus of some sort, which uses centrifugal force to squeeze some of the water from the bio-solids waste material; or (iii) a plate and frame filter press with hydraulic or mechanical drive, which uses mechanical pressure to dewater discrete batches of the bio-solids waste material. On a typical day in a typical treatment-plant, the bio-solids waste sludge that is treated by the municipality will result in a material mixture containing greater than 90% water-content, and less than 10% solids-content prior to the dewatering process by the municipality. Following the dewatering operation, there is nevertheless a relatively high water content remaining in the resulting, residual, bio-solids waste material, which residual will be concentrated to a mixture containing about 65% to 80% water-content and about 20% to 35% solids-content at the output-end of the municipality's waste-water treatment apparatus.

An underlying technical problem not addressed nor appreciated by conventional dewatering techniques is that most of the water remains associated with the biologically-active cells which comprise the residual bio-solids waste material; a significant amount of the total water remains inside the cells of this residual bio-solids waste material. That is, water molecules exist on the outside of the cells of the bio-solids waste material, and water molecules also exist on the inside of the cells of the bio-solids waste material. Also, water molecules are bonded between the cells of the bio-solids waste material. Therefore, since the individual cells of the sludge containing the water are not dewatered using conventional dewatering techniques, as the individuals cells have not been irreparably ruptured as a result of the conventional dewatering techniques currently used, so that most of the water in the aggregate within the matrix structure of each cell, it would be highly advantageous if this previously-dewatered, residual bio-solids waste-material sludge could be further dewatered in a continuous and extended manner by substantially removing the water located within the cellular matrix, in a commercially available process. This new approach to the further dewatering and sludge reduction at the cellular level of the residual bio-solids waste material would result in achieving a substantially-reduced volume and mass of the residual waste material requiring disposition by the municipality at the end of its waste-water treatment cycle. Especially when compared to conventional dewatering techniques presently utilized by municipalities, the reduction in the overall volume and weight associated with this residual bio-solids waste material, will result in a significant cost-savings to each municipality as a result of the expected future costs per ton of disposing substantially less residual bio-solids waste material in an environmentally safe manner, as proscribed by applicable rules and regulations.

After many years of study and public hearings, the EPA has recently promulgated EPA 503 regulations that have changed the applicable rules with respect to the disposition of bio-solids waste material by municipalities. The EPA 503 regulations address and promote the safe and effective disposal of bio-solids waste material by municipalities in accordance with the underlying rational and supporting facts of defining two different classes of residual bio-solids waste material, Class "A" and Class "B", and of the need to have an underlying, regulatory process which adopts a different, regulatory approach for each of the two classes of residual bio-solids waste material, and, thereafter, closely regulating the acceptable avenues of disposal for each of the two classes of bio-solids waste material. The difference between Class "A" bio-solids waste material and Class "B" bio-solids waste materials is directed to the active burden facing the disposal thereof. Class "A" bio-solids waste material is a biologically-inert, non-active waste material, and there are no limitations on the disposition of Class "A" bio-solids waste material by the municipality. However, Class "B" bio-solids waste material is a biologically-active waste material, which may be pathogenic, and, as a result, the disposition of Class "B" bio-solids waste material by the municipality is accomplished in a regulatory manner that is consistent with a highly controlled and regulated commodity at appropriate dump sites.

Prior to the recent promulgation of EPA 503 regulations, municipally-treated waste-material, both raw and previously dewatered, biologically active, non-sterile, residual bio-solids waste, could be disposed of by the local municipality by lake, ocean or river dumping; this often resulted in the unfortunate result that the various waters used for disposal would become wild with algae bloom, and the like, indicating severe nutrient enrichment of the water, to the detriment of adjacent land owners and downstream water users. Now, EPA 503 regulations effectively prohibit the disposal of any residual bio-solids waste material by municipalities in this manner. After the promulgation of EPA 503 regulations, there are currently only three approved options that can be used for the disposal of bio-solids waste material, namely: (1) incineration; the burning of bio-solids waste material in accordance with existing rules and regulations; (2) landfilling; there are now specialized landfills (e.g., Class D landfills) that to which the municipality can transport the bio-solids waste material for disposal; and (3) land application; where the bio-solids material is used as a fertilizer and/or soil enhancer. Option (3), land application, is governed by the classification of the residual bio-solids material, Class "A" or Class "B". From the viewpoint of the municipality, this dual classification of bio-solids waste material presents the opportunity to utilize new technology to solve the bio-solids waste disposal problem as a result of EPA 503 regulations. Of the above options, (1) and (2) above are the most expensive, with all of the inherent characteristics associated with a very highly regulatory environment. Obviously, it would be a great advantage if a municipality could end up with a process to treat previously dewatered waste material in a manner which will safely and effectively convert, at the cellular level, Class "B" bio-solid waste material, which is high regulated with respect to the disposal thereof by the municipality, into a safe Class "A" bio-solids waste material, which the municipality can then dispose of in any permissible environmentally safe manner, which allows the municipality to dispose of the solids waste material in a less costly and less regulated manner. Such a novel disinfecting and dewatering process would operate at the cellular level of the bio-solids waste material to rupture the cell wall in a manner non-repairable by the cell structure, thereby facilitating the internal water and related materials within the cell to be squeezed out of the cell structure, so that such is no longer actively contained within the cell structure by the cell. The resulting material is a safe, biologically-inert, solid material.

Furthermore, if such a novel disinfecting and dewatering process could be easily added to existing municipal waste-water sewage treatment plants in a manner which would not require any redesign of the waste-water treatment process or facility, local regulatory approval, and in a manner to facilitate a non-disruptive convenient retrofitable add-on module without any disruption to the municipality's on-going operations with respect to its existing and regulated waste-water sewage treatment facility at the very end of existing waste-water treatment facilities, such would be a great advantage to the industry.

The various municipal and industrial wastewater treatment plants in the United States generate a large amount of waste activated sludge. The total U.S. market, excluding food and agriculture sectors, is estimated to be about 7×106 tons/year of waste activated sludge (WAS), on a dry solids (DS) basis(1). About 70 percent of this market is municipal.

This WAS from municipal plants is typically thickened to 2–3 percent solids level and mixed with primary sludge to improve dewatering. The mixed sludge is typically treated with cationic polymers (polyelectrolytes) before being dewatered in belt presses or centrifuges. The typical solids content of the belt pressed mixed sludge is 16–18 percent. If the WAS is dewatered by itself, then the expected solids level is only 10–14 percent.

The pressed/dewatered sludge is mostly disposed off-site at various landfills at a typical fee of $50/ton (wet), which translates to $294/ton (DS), assuming 17 percent solids in the wet sludge. Some sludge is also incinerated or composted; but in both cases, further dewatering/drying is required. The typical cost for incineration is also about $300/ton (DS). Therefore, there is a need to develop alternative technology to reduce the cost of sludge, especially the WAS, disposal.

The present invention is based on the application of a pulsed electric field (PEF) to create holes in or disrupt the bacterial cell membranes in WAS. The effects of PEF on the flocculation/dewatering behavior of WAS has been tested and quantified.

It is known to kill indigenous microorganism, inoculated listeria, yeasts and molds in a pumpable material, such as milk, juice, raw eggs, and the like, by exposing the material to multiple, short pulses of electrical energy in the range of 10–30 KV. range. The electrical field pierces through, and, finally, causes the irreparable rupture of the affected cells of the microorganisms. By breaking down these cells, and preventing their self-repair mechanisms from repairing the cell-membrane damage, the food-product is safer, and the shelf-life of the product is extended. An example of this process in disclosed in U.S. Pat. No. 5,048,404.

In a previous (Phase I) project, it has been demonstrated the laboratory feasibility of pulsed electric field (PEF) for disrupting the biomass in waste activated sludge (WAS) derived from municipal wastewater treatment.

Encouraged by the Phase I results, a pilot plant for testing at one or two wastewater treatment plants that generate WAS has been developed. It has been decided that a pulsed electric field (PEF) system that could handle 0.5 to 1.0 pgm WAS feed be designed. This requires an 8 kw power supply capable of generating 30 kV and pulse generator capable of handling 50 amp peak, current, bi-polar pulses, square wave, 10 $\mu$s pulse width, and 3000 pulses/second (pps).

SUMMARY OF THE INVENTION

Accordingly, a general object of the present invention is to provide for the further sludge reduction of previously-dewatered, bio-solids, municipal waste-water sludge, using an non-arcing pulsed electric field (PEF) of between 15 KV-100 KV/cm. The application of this voltage to sludge reduction causes massive disruption to the cellular matter as well as the release of bound and intra-cellular liquids.

It is still another object of the present invention to provide a method for cellular rupture via high voltage D.C. pulse at an amplitude of 15,000 to 100,000 volts/CM, or of a variable and sufficient duration, and preferably between 15,000 and 50,000 volts/CM.

It is still another object of the present invention to provide a method for separation of solids and liquids within the bio-solids flow. It is still another object of the present invention to treat animal, paper-pulp, and plant wastes, besides municipal wastes, using electroporation.

In accordance with an illustrative embodiment of the present invention there is provided a pulsed electric-field system for the disinfecting and molecular distruction of biologically-active, waste-water sludge material.

Other objects, features, and advantages of this invention will become apparent from the following detailed description of the preferred embodiment of this invention, as illustrated in the accompanying drawings.

BRIEF DESCRIPTION OF THE DRAWINGS

The foregoing summary, and other objects, features, and advantages of the present invention, its organization, construction and operation, together with further objects and advantages thereof, will be best understood from an examination of the following description of the preferred embodiment of the invention will be better understood when read in connection with the accompanying drawings. For the purpose of illustrating the invention, there is shown in the drawings an embodiment which is presently preferred, it being understood, that the invention is not limited to the specific methods and apparatus disclosed.

DETAILED DESCRIPTION OF THE PREFERRED EMBODIMENT

Figure 1:
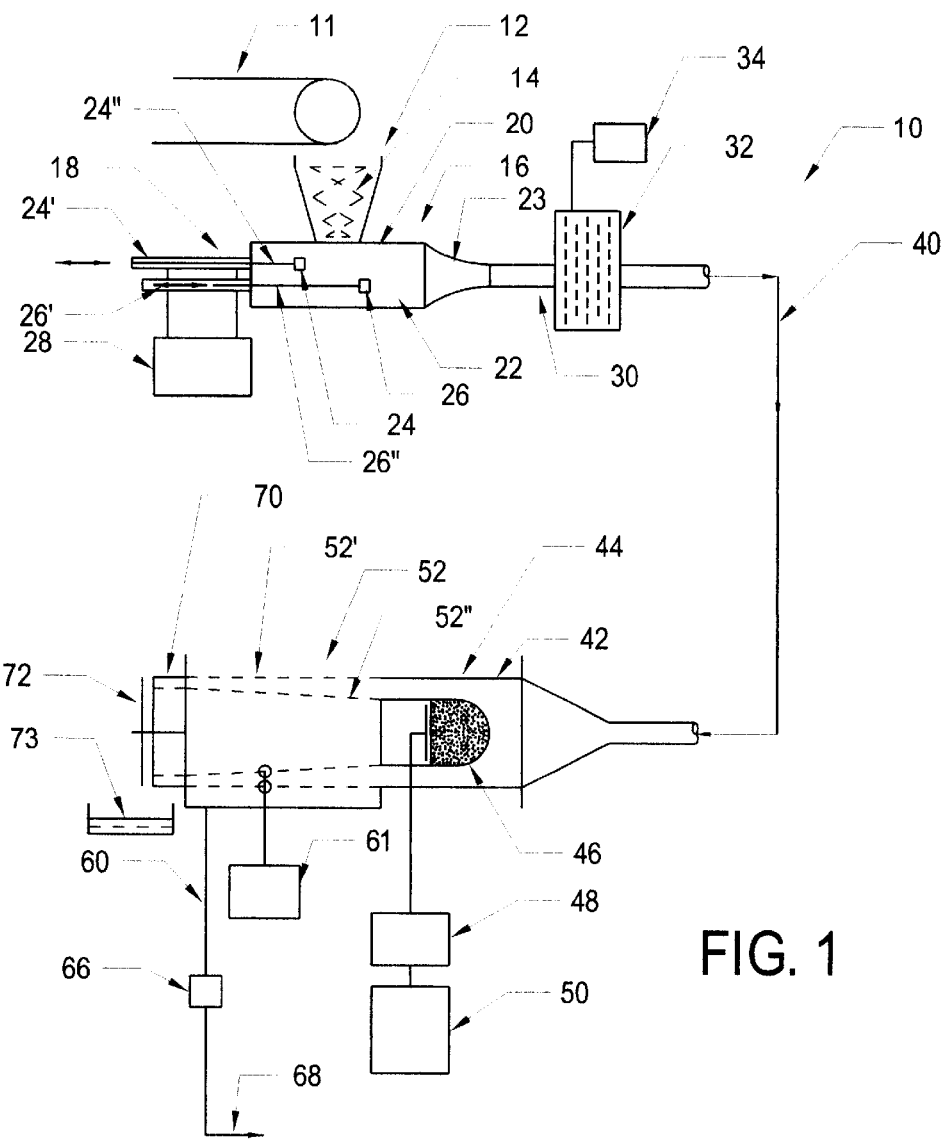
FIG. 1 is a flow schematic of the process of the invention.
Figure 2:
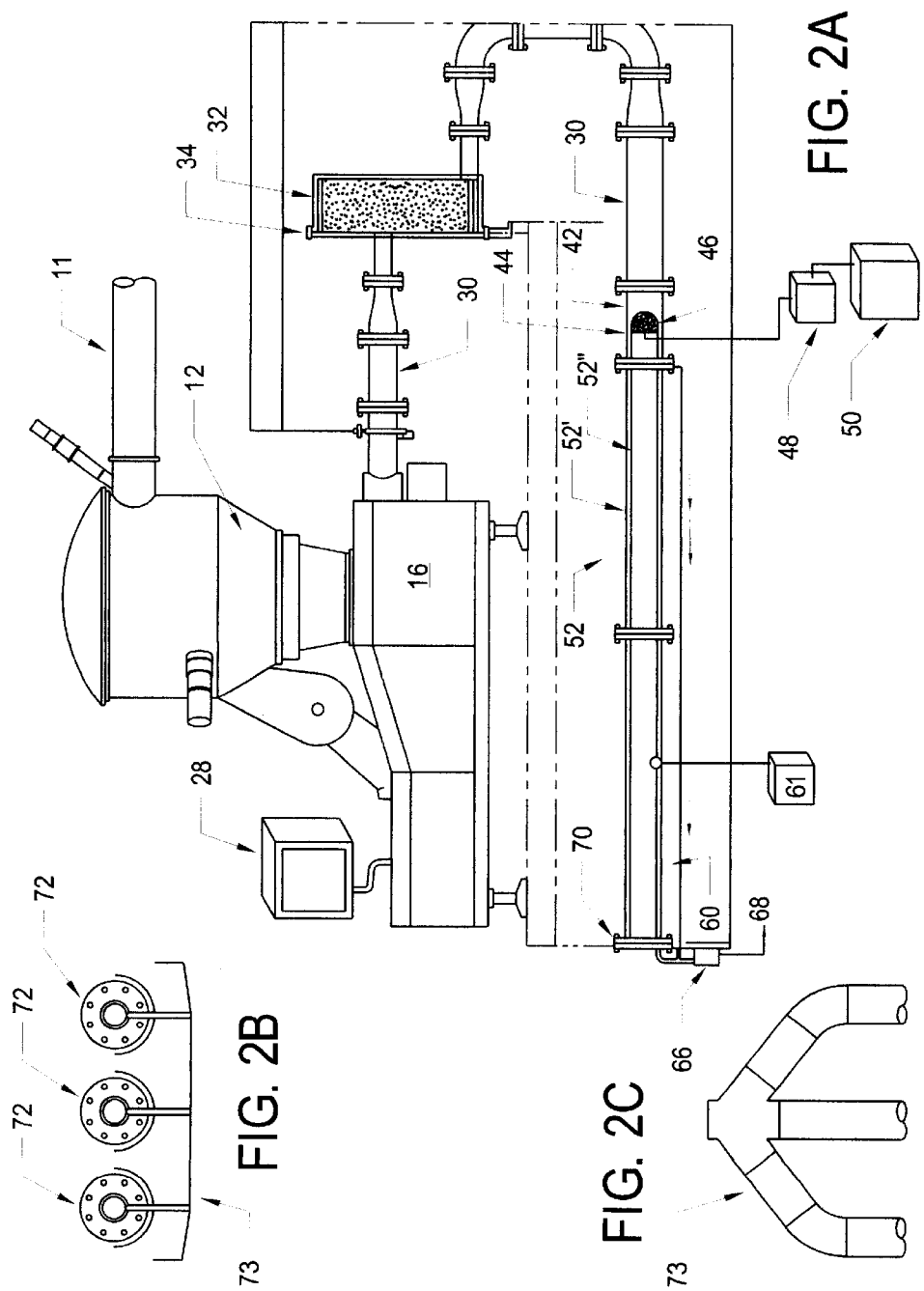
FIG. 2A is a proximate-to-scale, general arrangement of the system of the invention.
FIG. 2B is an elevational view of the pelletizing-heads section of the apparatus of FIG. 2A.
FIG. 2C is a front, elevational view of the discharging conduits from the pelletizing-heads section of FIG. 2B to a collector.

Referring to the drawings in greater detail, wherein like-referenced numerals indicate like elements throughout, there is shown in FIGS. 1 and 2A the apparatus 10 of the invention for dewatering previously-dewatered municipal waste-water sludge, or for treating animal and/or plant waste. The apparatus 10 of the invention is added on to the outlet of a conventional municipal waste-water treatment plant for dewatering bio-solids sludge. Thus, the apparatus 10 is a secondary, or tertiary, system for the further dewatering of previously-dewatered sludge that has been dewatered by a primary system. It is, of course, possible to use the apparatus 10 alone, so that it serves as the only dewatering system; however, owing to financial restraints, it is envisioned that the apparatus 10 will serve to further dewater previously-dewatered sludge.

A conventional municipal waste-water treatment plant typically comprises belt filter presses, centrifuges, plate and frame, or other, conventional dewatering technologies that discharge the sludge-material via conveyor to a storage bin, hopper, container or truck body for intermediate retention prior to transit for off-site disposal. Such a conveyer is indicated by reference numeral 11 in FIG. 1, and it constitutes the outlet, or end-point, at which the conventional dewatering technique terminates, and the apparatus 10 of the present invention begins to function. According to the invention, instead of the output of the conveyer 11 being fed to a truck, or the like, for off-site disposal, it is instead directed to the inlet of the apparatus 10 of the invention by means of a variety of standard, material-handling equipment and methods that discharge the output from the conveyer 11 into the input of the apparatus 10 of the present invention.

The input of the apparatus of the invention is a conically-shaped hopper 12 with spiral feed 14. This conically-shaped hopper with spiral feed 12 will uniformly charge, or load, the previously-dewatered, bio-solids waste-water sludge exiting the conventional dewatering apparatus via conveyer 11 into a doubles crew auger feed-section 16 having a hydraulically driven, self-priming positive displacement pump 18, such as Abel Pumps Corporation's Model "SH" with cone valves, whereby the thick-consistency sludge is pressurized. This pressurized environment is important in order to create the driving force to the filter at the end of the process (discussed hereinbelow), and, also, so that the sludge may be heated, if necessary, without causing the generation of steam, which, if produced, would be detrimental to proper disposal. The double-screw auger feed-section 16 can also be utilized to introduce various alkaline or acidic chemicals to enhance the electroporation effect of the disrupter cell, discussed hereinbelow, or to modify the PH of the bio-solids to conform to the intended land use application, or to enhance the dewatering effect of the filtration module. The previously-dewatered, bio-solids, waste-water sludge is alternately drawn through one of two suction valves, and then into one of two pump cavities 20, 22, and pumped through one or two discharge valves into a common discharge port 23. The pump pistons 24, 26 are driven by hydraulic cylinders 24', 26' via piston rods 24", 26". The hydraulic cylinders are powered by a conventional hydraulic power-package 28. In one embodiment, the common discharge port 23 is connected via piping 30 to the inlet of a helical heat exchanger 32, such as that manufactured by Graham Manufacturing Company, Model "Helixflow". The heating source 34, if necessary, to the exchanger is preferable low pressure steam. The exiting bio-solids sludge temperature is controlled via a standard thermostatic steam valve-control to a range of between 40 degrees C. and 60 degrees C. In those cases where the bio-solids sludge is of such a consistency that it readily and easily flows without having to raise its temperature, then the step of heating the bio-solids sludge, and the equipment described above for heating it, may be dispensed with. The heat exchanger, Am also, incorporates a vent to collect various off-gasses resulting from the heating process, in a conventional manner. The off-gasses are preferably collected via a vacuum pump for subsequent, ambient discharge or treatment as dictated by the content of the off-gasses. The main purpose of venting is that the electroporation performance can be enhanced by eliminating as much air as possible from the sludge material, and so that, as the material is heated in the heat exchanger, there will not be included vapors created.

Figure 3:
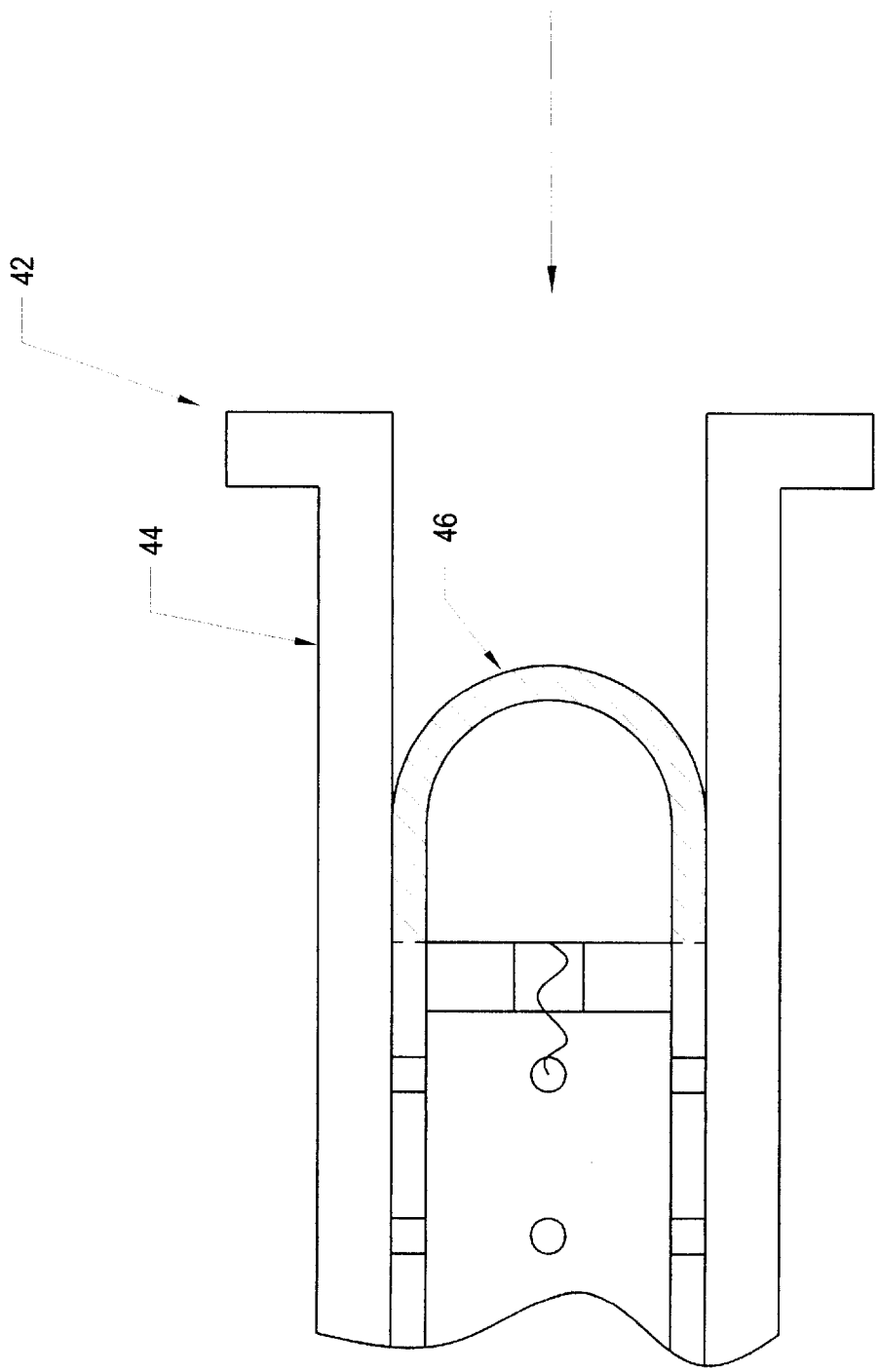
FIG. 3 is an elevational cross-sectional view showing the general arrangement of the disruptor cell.

From the heat exchanger 32, the thermally conditioned bio-solids continue under pressure through interconnecting piping 40 to the disruptor cell 42, best seen in FIG. 2A and 3. The disruptor cell 42, in one embodiment, consists of an electrically-grounded, cylindrically-shaped, outer metallic shell or annular pipe 44, with an internal, electrically-insulated, high voltage electrode 46. The electrode design is such as to provide laminar flow characteristics over its leading surface into an approximate 3/8" (1 cm) annulus between it and the annular pipe 44, to thereby create a uniform disruption zone. The high voltage electrode 46 is preferably generated, or pulsed, in a uni-polar or bi-polar mode, and at an amplitude of between 15,000 and 100,000 volts per centimeter, at a frequency commensurate with the characteristics of the bio-solids material being treated. Thus, the laminar-flowing sludge is subject to what may be called an "electro-baric" field, which is an electric field exposed to constant-pressure flowing media. A conventional, solid-state pulse generator 48, such as that produced by Scientific Utilization, Inc. of Huntsville, Ala., having a capacitive discharge circuit receives power from a power supply 50. Power switching is accomplished via a spark gap, "Thiotron", or solid state switch. The pulse control unit, the power supply and switching sub-system are standard commercially available items regularly used in the electric power, laser, and bio-technology industries.

The controlling principle at work within the disruptor cell is electroporation. During the electroporation process, sufficient voltage potential develops along the molecular cell wall to result in an imbalance of forces, which causes the rupture of the molecular cell wall. Upon rupture, the cell undergoes "lysis", which is the loss of intra cellular fluids and materials. As lysis continues, the cell dies, and its liquid content is released, which liquid content is mostly water molecules. In addition, high voltage discharges releases or breaks inter cellular water mechanical/electrical bonds. After this disruption occurs, the bio-solids material becomes sufficiently biologically inert to meet Class "A" EPA 503 standards, and, is suitable for extended dewatering.

Figure 4:
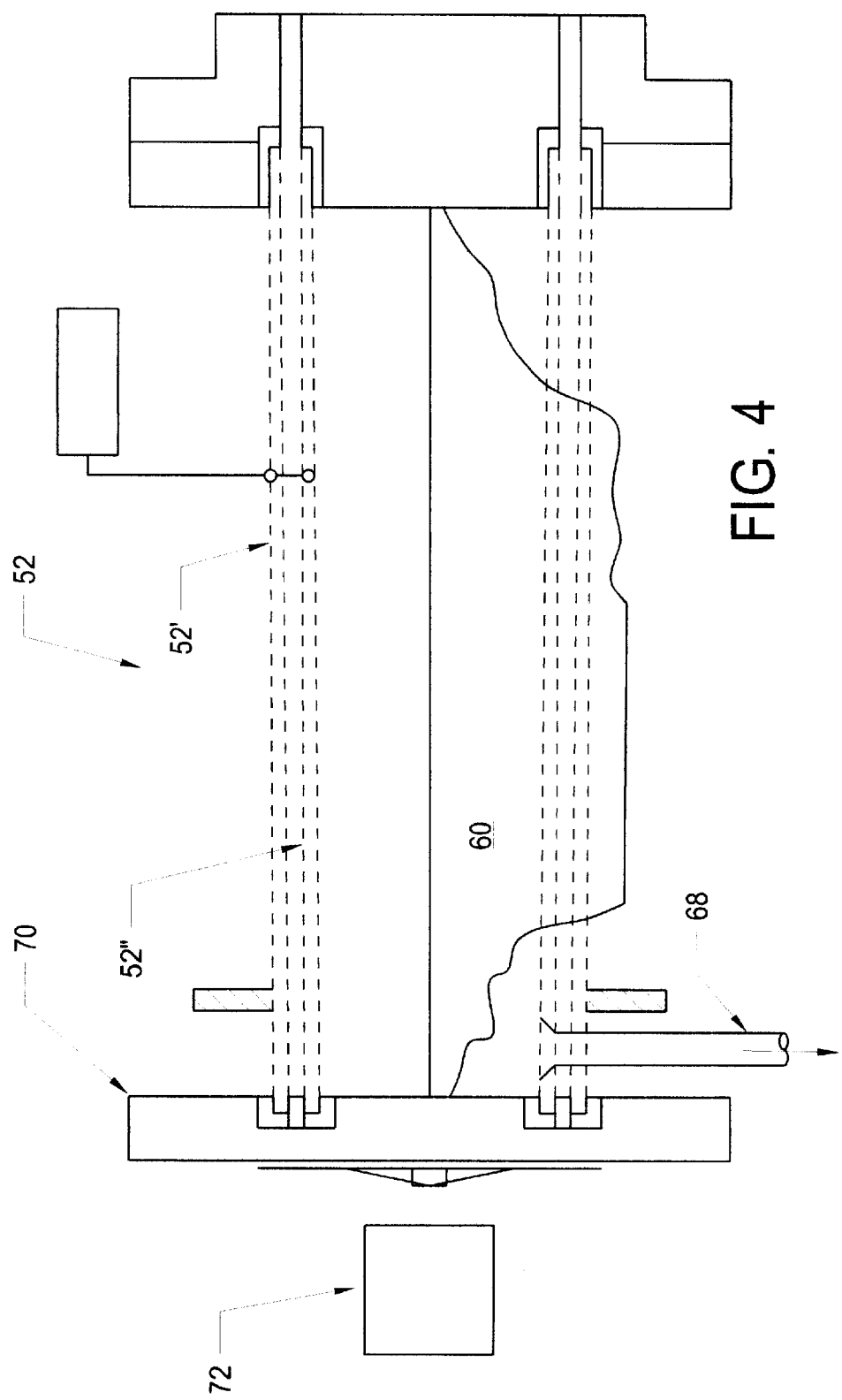
FIG. 4 is an elevational cross-sectional view showing the general arrangement of the filtration module.

The disruptor cell 42 is directly connected to, and longitudinally axially in-line with, a filtration module 52 consisting of two electrically charged metal filtration membranes 52', 52", and which is best seen in FIGS. 2A and 4. The outer, filtering membrane 52' is a concentric cylinder, or porous metal pipe, while the inner, filtering membrane 52" is an expanding, frustoconical-shaped metal member, such that the annular region between the inner and outer filtering elements gradually and continually narrows or tapers along the length of flow in the filtration module. This geometry between the two filtering elements creates a continual decreasing cross-sectional area along the length of the filtration module. The concentric filtration surfaces conserve overall space while optimizing a characteristic of bio-solids under pressure, which characteristic is the migration and adherence of liquids to a contact surface, whereby the liquid water is separated from the solid content of the waste. The metal filter membranes that may be used are those manufactured by the Porous Metal Components division of Newmet Krebsoge, Deerfield, Ill.

The use of low voltages for aiding in filtration is a well-known method of separating out particles from water, and is also utilized on the filtration surfaces of the filters 52', 52", and produced via low-voltage supply 61. The filtration cell is operated at a pressure of between 1000 to 1500 psi, depending upon the desired level of additional dewatering, and the clarity of the liquid filtrate. The liquid filtrate is collected from the tapering inner metal membrane filter 52" and the parallel outer metal membrane filter 52' via a liquid-collection assembly 60, which consists of an external drain pan 62 and an internal drain 64 combining to a common drain to a liquid metering unit 66. The liquid metering unit is conventional instrumentation, and is used to monitor system performance. The liquid meter discharges to the return piping 68 of the apparatus. The tapering or narrowing annular region between the two membranes causes a constant pressure on the sludge as it flows. The operating pressures within the annular region between the two metal membranes will be between 1000–1500 psi, which causes any remaining water in the sludge to be "squeezed out".

The disinfected and dewatered bio-solids material exits the filtration module through a pelletizing head 70 with a rotating cutter assembly 72, as best seen in FIGS. 2A and 4, and then conveyed in a collector-conveyer 73 for subsequent disposal. The bio-solid material is biologically inert, since, whereas a normal healthy bacteria or virus has DNA which is reproducible, once the DNA mechanism for the bacteria or virus is broken, as occurs in the present invention, the resulting biological material is inert thereafter. The pelletizing head consists of a plurality of circular plates each having a circular array of holes coincident with the annular, exit-flow channel of the filtration module. The rotating cutter assembly shears the extruded bio-solids into pellets which drop onto the solids-collection conveyor which transfer the disinfected, twice-dewatered, volume/mass reduced bio-solids to the existing storage bin, hopper, container, or truck body for intermediate retention prior to transit for off-site disposal.

Almost all cells in the sludge are greater than ½ micron in size, and the majority of are greater than 1 micron in size, and some are as great as 3 to 5 micron range. Preferably, each of the metal filter membranes 52', 52" will typically be a 10-micron mesh.

The metal membranes 52', 52" will have to be cleaned periodically. To do this, scrapers would be provided. Alternatively, back-pulsing the metal membranes with steam may be used.

Figure 5:
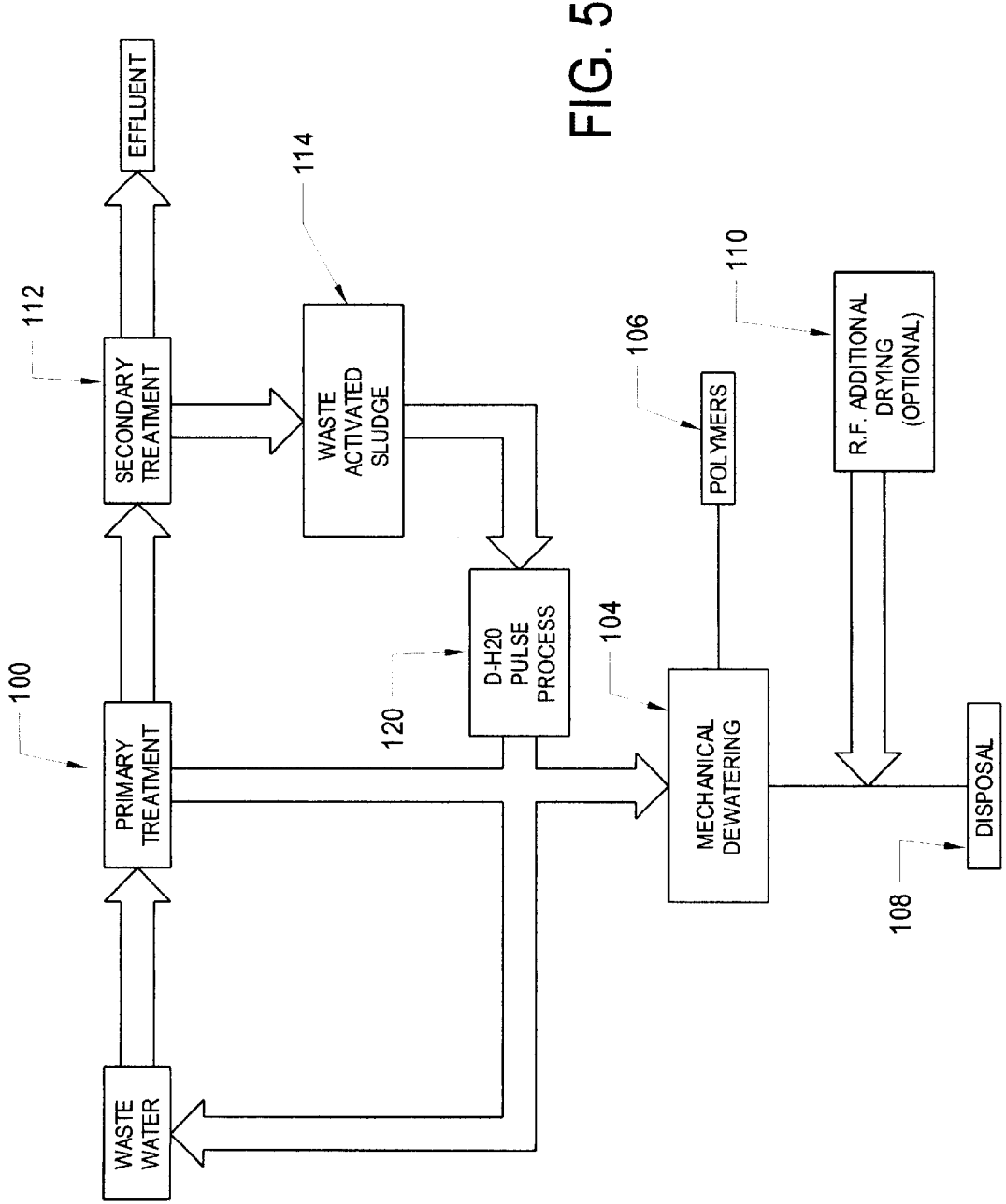
FIG. 5 is a schematic showing the flow-process of treating waste-activated sludge (WAS) using either the arcing or non-arcing pulsed electric field (PEF)of the present invention.
Figure 7:
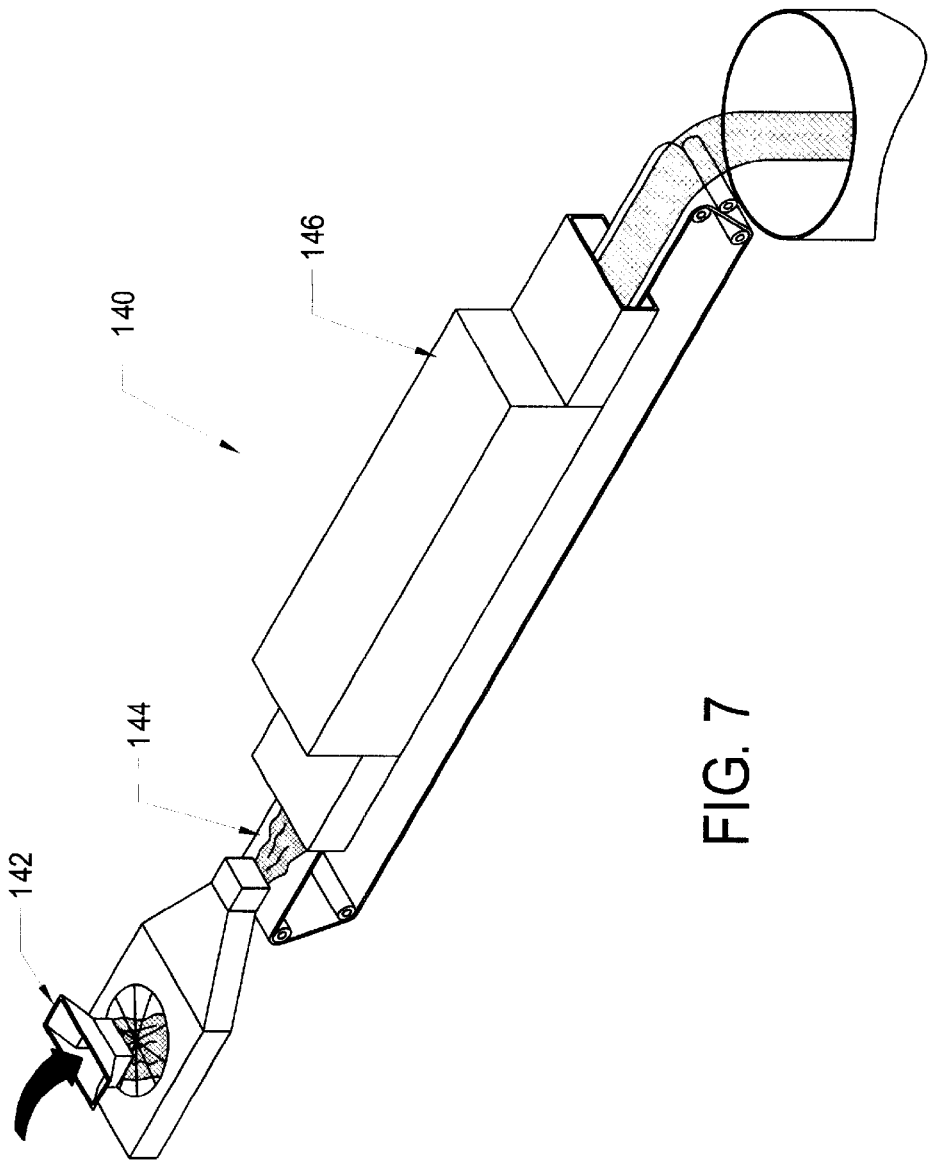
FIG. 7 is a plan view showing the R.F.-generating equipment for generating R.F. waves for heating the treated and previously-dewatered sludge in order to further reduce the water content thereof.
Figure 8:
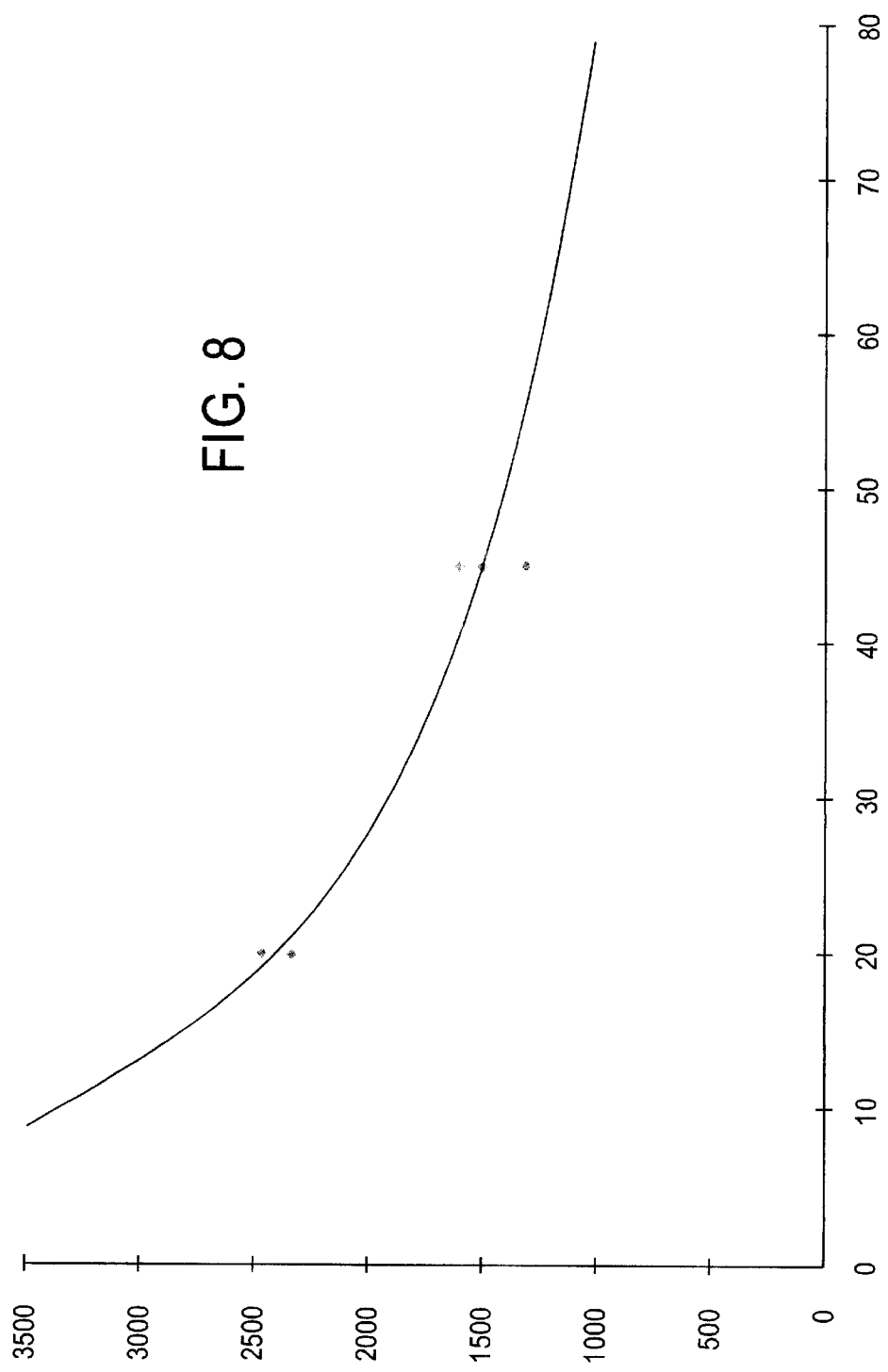
FIG. 8 is a graph showing the reduced resistivity, or increased conductivity, of the waste sludge as the relative solids-content thereof increases.

The pulsed electric field (PEF) may be a non-arcing one. Test results have shown the efficacy, effectiveness and enhanced dewatering effects on WAS for non-arcing systems. In FIG. 5, there is shown a schematic flow diagram for a non-arcing system. The waste water enters the first stage of treatment which removes large pieces of solids, as by sedimentation tanks 112. The solids removed by this treatment may be delivered to a solids-digester where gas production is achieved in a conventional manner, as by anaerobic digestion. Typically, 45 percent of the solids are consumed during digestion. Then, the remaining solids are conveyed through a belt-press, for example, for mechanical dewatering 104. Polymers 106 are added in order to achieve charge neutralization or molecular bridging. Thereafter, the remaining bio-solids are disposed of in a conventional manner 108. Further treatment, such as R.F. or of the bio-solids 110 may be performed in the conventional manner. FIG. 7 shows a R.F. device or tunnel 140 through which the sludge enters after having been conventionally, mechanically dewatered by a belt press or centrifuge 104. The sludge is input to the device 140 via a funnel 142, and placed on an endless belt 144 for passage through the main housing 144 in which is mounted conventional R.F.-generating equipment, whereby the sludge may be further dewatered by as much as another 25%, so that solids-content may be as high as 50%. The sludge entering the device 140 is highly conductive, as can be seen with reference to FIG. 8, which clearly shows a decrease in resistivity of the sludge with increased dewatering. This increased conductivity arises from the fact that a considerable portion of the solids-content of the sludge consists of metal. This high or super-conductivity of the sludge allows the R.F. device 140 to super-heat the sludge to further reduce the water content. The R.F. generator is conventional, and produces R.F. electromagnetic waves within the low-frequency range of between 10–1000 MHz.

Returning again to FIG. 5, the liquid sludge from the primary treatment processing is delivered to secondary treatment processing 112 where the present invention is performed. The waste-activated sludge (WAS) 114 coming from the sedimentation tanks 100 may, if necessary, be thickened using conventional thickeners, and then the WAS is delivered to the non-arcing PEF apparatus 120 of the present invention, described above. From there, the dewatered sludge is preferably delivered through mechanical dewatering 104 and subsequent disposal 108. Alternatively, the dewatered sludge from the PEF dewatering apparatus 120 may be re-directed back through the primary treatment process or sedimentation tanks 100 for removal of the solids thereby, and subsequent for disposal.

Figure 6:
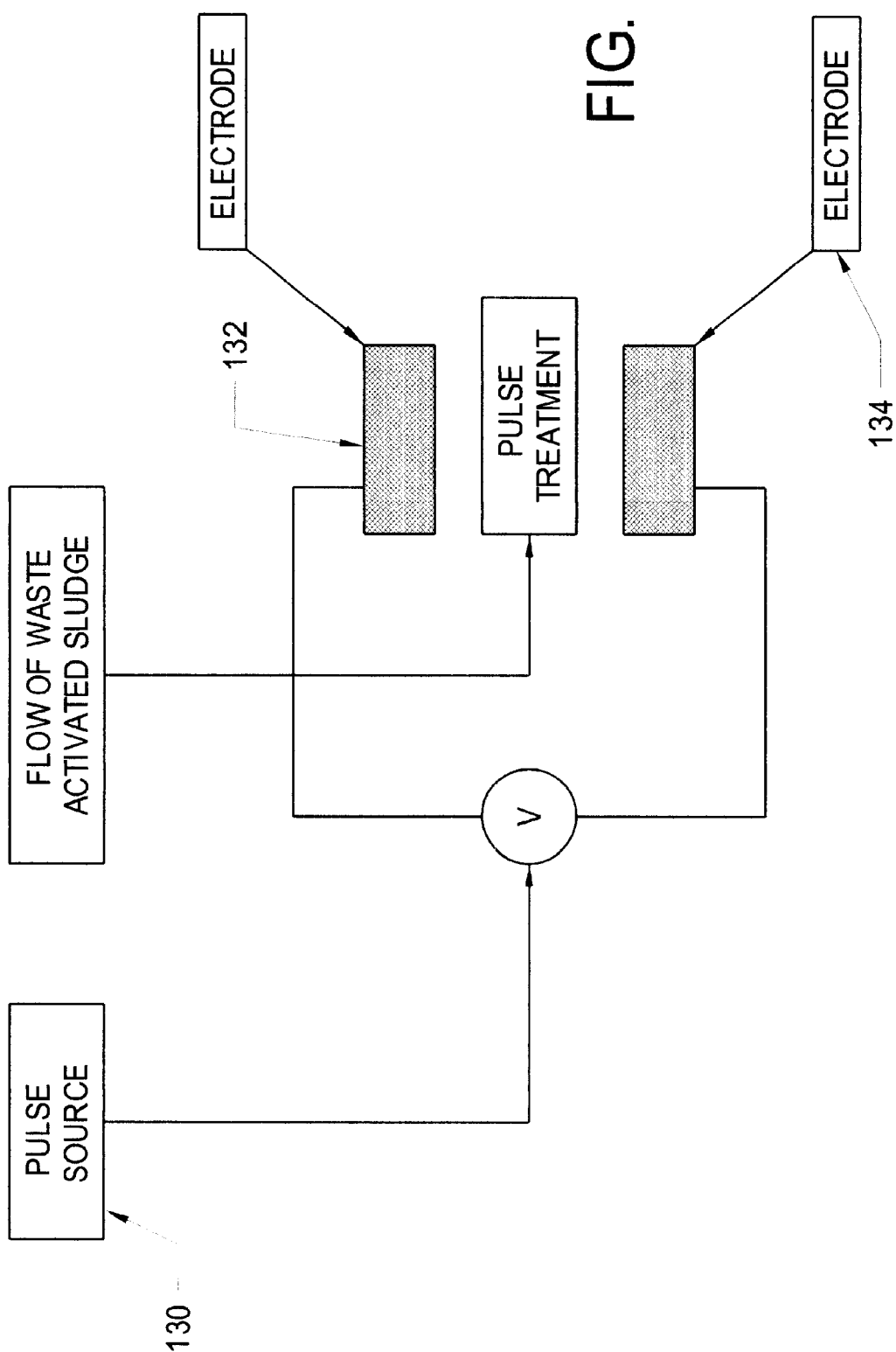
FIG. 6 is a schematic showing the pulsed electric field treatment flow for both arcing and non-arcing systems of the present invention.

FIG. 6 is a schematic showing the dewatering process 120 in greater detail. The pulsed-electric source 130 generated voltages preferably in the range of between 15 KV/cm. and 50 KV/cm. The waste activated sludge is delivered between electrodes 132, 134 where the electric-pulse treatment occurs, as described above in greater detail. While in the preferred embodiment a spherical end is disclosed against which the WAS impinges, and at which the PEF is applied, it is to be understood that the PEF may be applied at an extrusion orifice or orifices instead of against the spherical end. The spherical end is disclosed for achieving laminar flow; however, such need not be a requirement for performing the present invention.

Tests conducted by Battelle Laboratories of Columbus, Ohio, have confirmed the efficacy, efficiency and reduction of intercellular and intracellular water of WAS according to the present invention. The "Final Report" publication thereof entitled, "Feasibility of Biosludge Dewatering Using Pulsed Electric Fields", by Satya P. Chauhan, Sep. 17, 1998, which is incorporated by reference herein. The results from this test program are summarized below.

"Laboratory Feasibility Tests"

"Non-Arcing PEF System"

Employed were electric fields with minimal, if any, arcing between the electrodes. Field strengths up to about 50 kV/cm were employed to disrupt the cellular matter. The treated samples were flocculated and then dewatered in a laboratory press to simulate a belt press. The results of this series of tests indicated that the PEF treatment can cause massive changes in the properties of sludge as well as the filtrate. The results initially were puzzling in that the solids content of the PEF-treated dewatered sludge was within one (1) percentage point of the control sludge even though there was substantial (twenty percent [20%] or more) reduction in the quantity of dewatered sludge. However, this can be explained on the basis that PEF causes electroporation leading to deflation of cells due to release of the intracellular fluid and the associated dissolved solids. In other words, for such a process, it is not sufficient to just focus on the dry solids content of the dewatered/pressed sludge; the actual yield of dewatered solids to be disposed must be determined.

The PEF treatment improved the initial dewatering rate, measured as the amount of filtrate recovered in the first minute of predewatering, in all tests at the standard flocculent dosage. A part of this is likely due to the release of some intracellular fluid, but there is some evidence of a beneficial effect of PEF on flocculation behavior, especially at the lower energy levels. The possible release of some cellular fluids was also supported by the finding that both the dissolved solids content and the dissolved organic content of the filtrate increased substantially due to PEF treatment.

It is hypothesized that the PEF treatment causes the following effects with increasing energy [kwh/ton(DS]) level:

1. Lower Levels (<5 K Wh/ton): Flocculation is improved allowing polymer requirements to be reduced significantly.
2. Mid Levels (5–50 k Wh/ton): Electroporation reduces the intracellular water (i.e., fluid retained by cells) without impacting intercellular water (i.e., the fluid between cells) in the dewatered cake.
3. Higher Levels (>about 50 k-Wh/ton): Cell breakage generates lots of small particles causing the flocculation with conventional polymers to be worse. Under these conditions, a different set of coagulants/polymers should be used.

With the limited date available, it is not possible to pinpoint the three energy ranges in this hypothesis. But the economics of a PEF-based process depends on properly recognizing the optimum conditions to achieve the desired effect so that the optimum treatment system, which integrates PEF treatment and post treatment, can be designed.

The results also suggest that a field level of about 15–25 kV/cm may be sufficient to achieve cell disruption. From a capital cost point, it may be better to use as low a field as possible even if it makes the energy cost go up.

Figure 9:
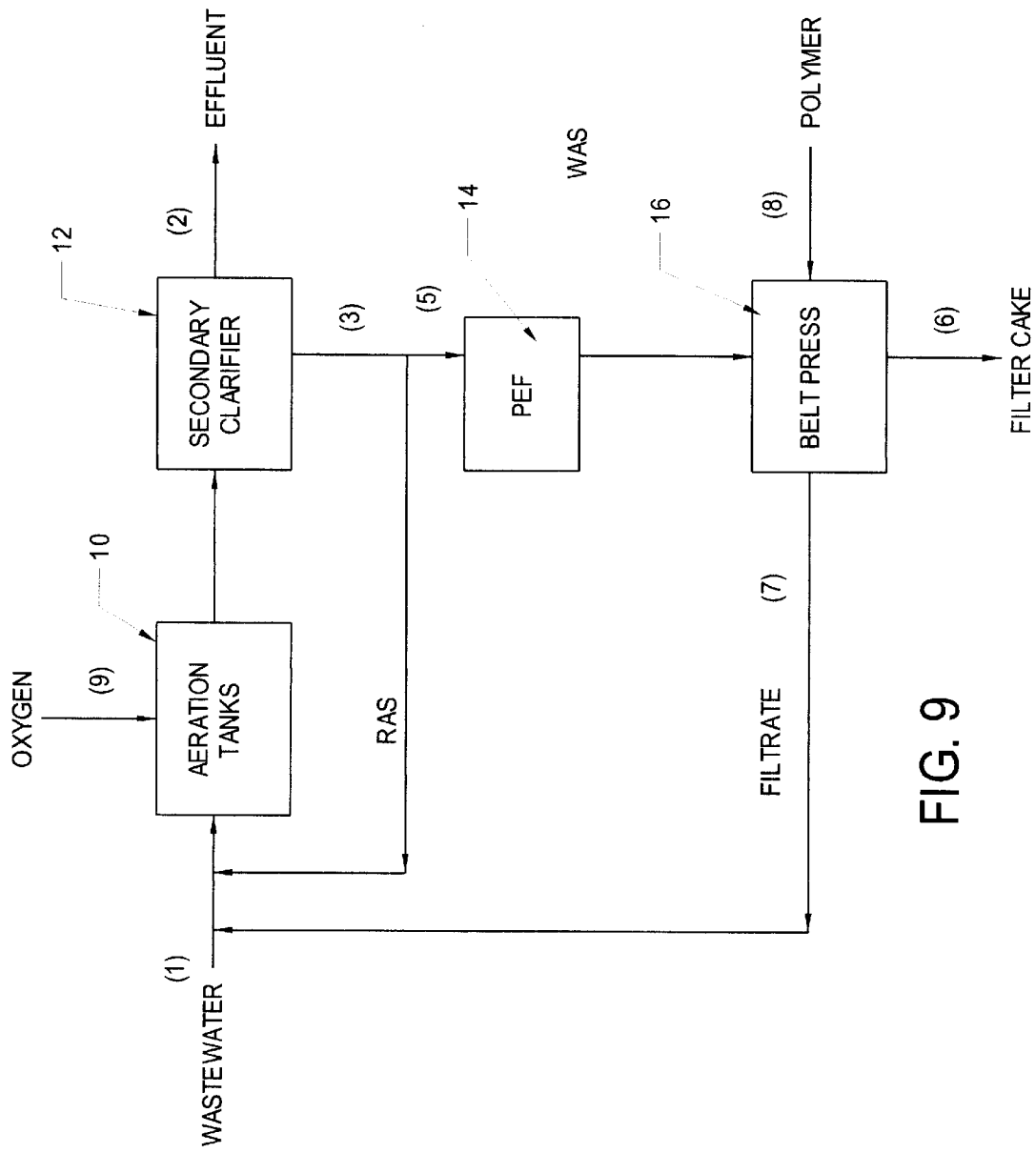
FIG. 9 is a schematic showing the electroporation system as used as a secondary dewatering treatment.
Figure 10:
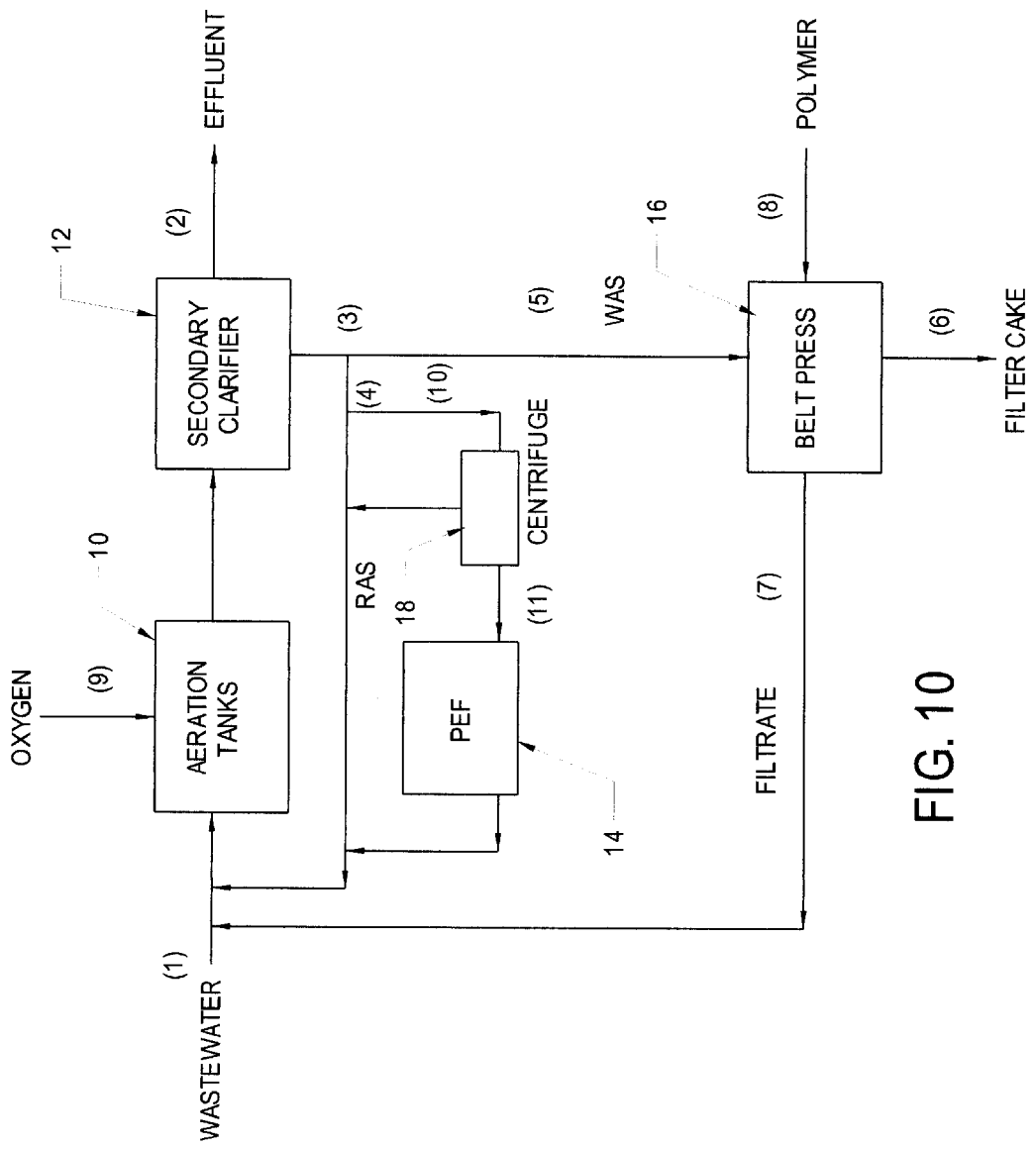
FIG. 10 is a schematic showing the electroporation system used in conjunction as a primary dewatering treatment in accordance with the present invention.

Referring to FIGS. 9–12, the original concept for the pulsed-electric filed (PEF) effect using electroporation was to dewater the previously-dewatered sludge. However, additional PEF data on a paper plant sludge has indicated that the big PEF effect from electroporation of WAS occurs at higher energy levels (e.g., 100 J/mL; or 400 k Wh/ton (DS) for feed at 6 percent solids), whereby cells are disrupted. The result is inactivation of cells, breakage of cells and release of some intracellular dissolved/organic matter and typically a worsening of flocculation and dewatering. Therefore, a more effective way of using this process is to recycle all of the PEF-treated sludge back to a aerobic bioreactor to utilize the sludge as food; that is, it has been discovered that the PEF-electroporation effect on disrupting the cellular units of the WAS has been to release intracellular dissolved/organic matter. This intracellular dissolved/organic matter is just the type of ideal "food" upon which the aerobic bioreactor flourishes. Thus, returning this released intracellular dissolved/organic matter back to the aertion tanks or aerobic bioreactor will increase the BOD load on the bioreactor, and will thus reduce the quantity of WAS by up to about 50 percent. The flowsheet for this scenario is shown in FIG. 10. Thus, it is now practical to employ the PEF-electroporation system as not only a secondary system for treating previously-dewatered sludge, but also to employ it as a primary system, as described hereinbelow.

Referring to FIG. 9, there is shown the schematic for using the PEF-electroporation system as a secondary treatment. In FIG. 9, the wastewater is delivered to the primary treatment, aerobic-reactor tanks 10, and from to a secondary clarifier 12. From there, the WAS is delivered to the PEF-electroporation system 14 of the invention for deactivating the WAS to make it a Class "B" biomass for easier disposal. The biomass is then sent to a belt press 16 for further processing and disposal.

Referring now to FIG. 10, there is shown the flow chart of the present invention for employing the PEF-electroporation system as part of the primary treatment. In this system, the bio-solids exiting from the PEF-electroporation system 14 are returned to the aeration tanks 10, since, as explained above, the PEF process causes the release of intracellular, dissolved organic matter, which is used as "food" for the bacteria of the aeration tanks. This "food" not only is further treated in the aeration tanks via aerobic digestion, but actually causes the aerobic digestion process in the aerobic tank itself to be accelerated for the same amount of oxygen supplied.

A practical problem with the system of FIG. 10 is that the PEF throughput needs to be of the same order of magnitude as the WAS disposal rate in order to see a noticeable effect of PEF on WAS reduction. For this reason a 1.8 ton (DS)/day PEF system has been chosen as a pilot plant. With such a system, a WAS reduction of 0.9 ton/day on a dry basis or 7.5 tons/day on a filter press cake (at 12 percent solids) basis may be achieved. In terms of thickened sludge (at 2 percent solids) basis, this translate to elimination of 45 tons/day needing to be flocculated and dewatered. This will require PEF treatment of 15 gpm WAS at 2 percent solids.

One way to reduce the cost of the pilot plant, which is driven by the PEF power supply and pulser cost, is to pre-thicken the WAS. Therefore, a 15 gpm rental centrifuge 18 is used for pilot testing. It is estimated that this will produce a 5 gpm feed for the PEF reactor at a solids content of 6 percent. Such a feed can be handled by a Moyno pump. The feed streams to the centrifuge and the PEF units are represented as Stream Nos. 10 and 11, respectively in FIG. 10. However, in practical application such as centrifuge may not be necessary.

PEF Power Supply and Pulser Design

Figure 11:
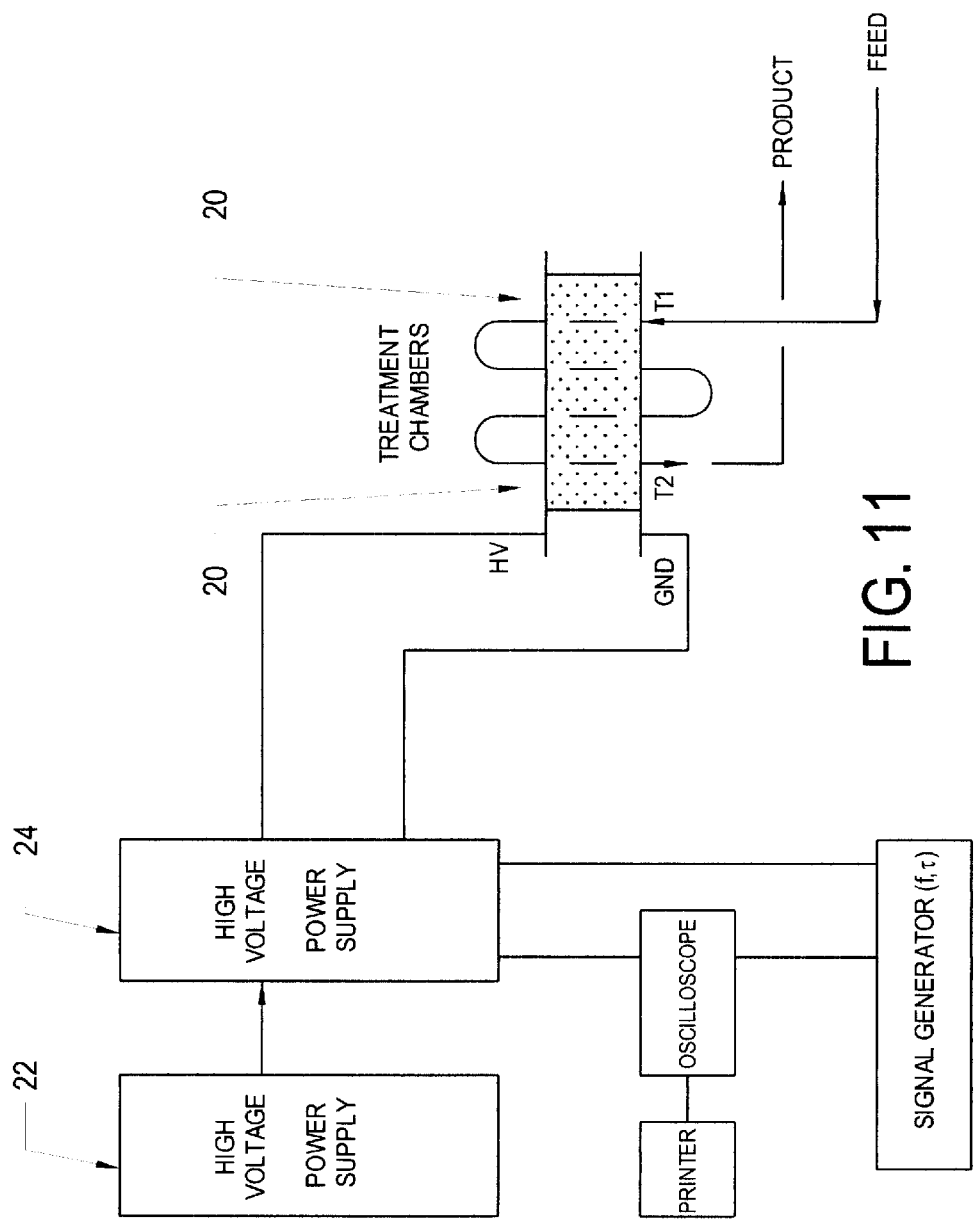
FIG. 11 is a schematic showing the electroporation sub-system for use in dewatering municipal, paper-pulp, animal and plant waste sludges.

The conceptual design of the power supply and the pulse generator (pulser) for the system of FIG. 10 is shown in FIG. 11. This figure shows four chambers 20 in series, although two chambers also can be used if the pulse rate is increased. The design requires a 35 kW input power supply 22 (32 kW continuous output) delivering 30 kV. The pulse generator 24 is 200 amp maximum current and a pulse rate of 4,000 hz.

Figure 12:
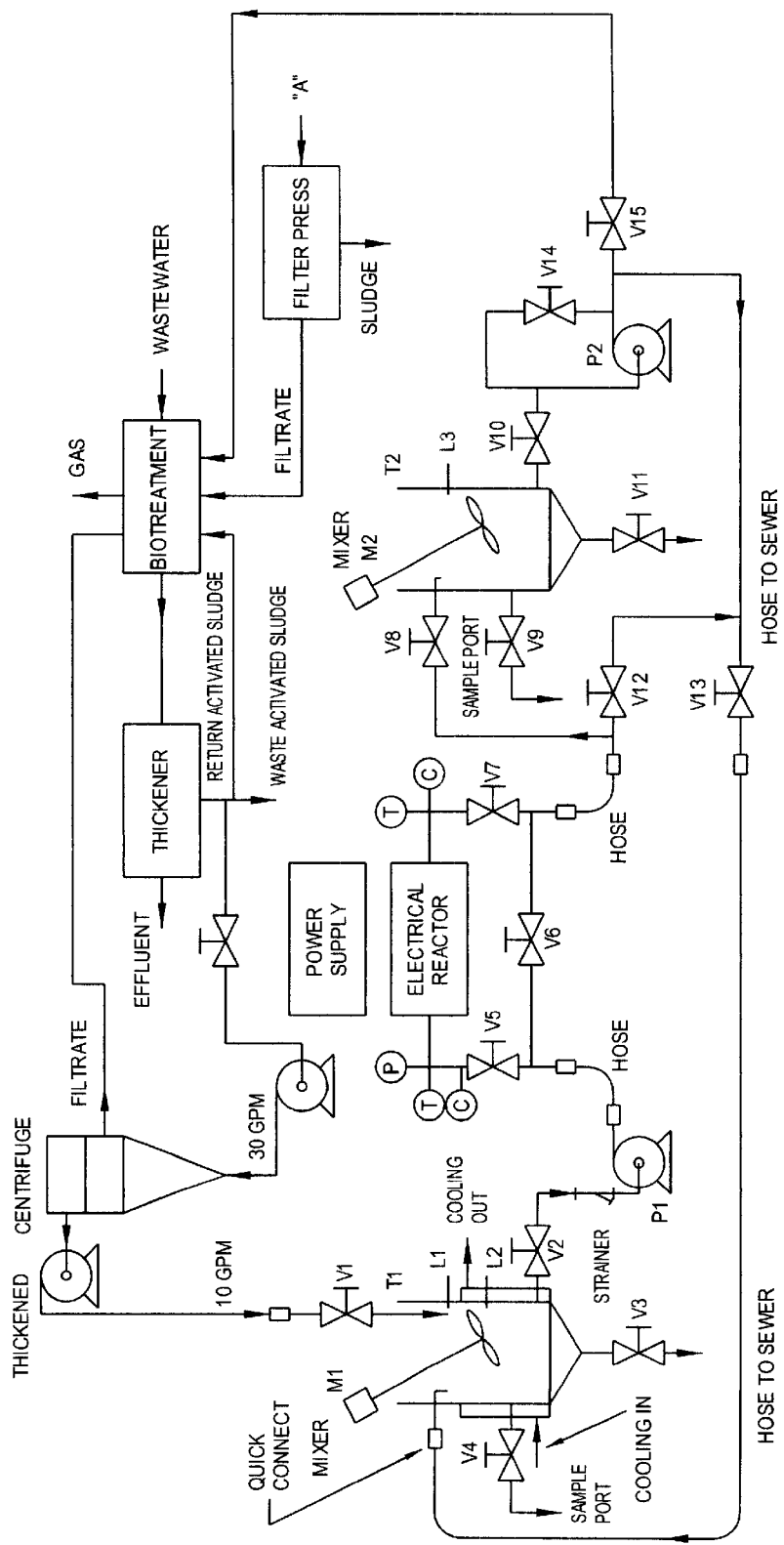
FIG. 12 is a schematic diagram showing the overall apparatus of the present invention incorporating the electroporation sub-system for use as a primary or secondary dewatering treatment.

The actual sludge handling system and the associated instrumentation is shown in FIG. 12. Tank Ti holds up to 100 gallons of untreated feed material, delivered through valve V1 from the centrifuge 18. A mixer is provided for blending infeed material. A bottom drain allows disposal to sewer at the end of a test run. Valve V4 is provided for withdrawing a sample for analysis. Material leaves T1 through V2 and a strainer to a variable-speed progressing cavity pump, which can flow from 0.5 to 5.0 gallons per minute. The tank, pump mixer and associated valves are mounted to one 42-inch square skid for transport purposes. The feed leaving P1 passes through quick-connect fittings to a reinforced hose to the reactor.

The PEF-electroporation reactor subsystem includes a power supply, pulse generator and pairs of treatment chambers as described above with reference to FIG. 11. These would be mounted to a skid, along with associated valves V5, 6 and 7. Quick-connect fittings and hose convey the treated material to valves on the outlet tank skid. Valves V12 and 13 permit the treated material to be recycled back to T1. Valve V8 permits the treated material to enter tank T2, of 100-gallon capacity. As with T1, a mixer, a sample port and a bottom drain are provided. Tank T2, pump P2, mixer M2 and associated valves are mounted to another skid. Treated material leaving through V10 leads to transfer pump P2. Valve V18 is a globe style for adjusting the flow rate through V14 to tank T3. Valve V13 allows treated material from T2 to return to T1, assisted by P2, to increase treatment time.

The P2 pump is used to return the treated sludge to the biotreatment plant, aerobic tanks 10, when the PEF-electroporation system is used as a primary system, or optionally to filter press 16, if desired, when the PEF-electroporation system is used as a secondary treatment.

Safety logic has been incorporated as follows. Level control L1 will close V1 to prevent overfilling T1, with subsequent spillage. Level control L2 will shut down P1 and the power supply when the liquid level becomes too low. Level control L3 and T2 will shut down P1 and the power supply when tank T3 becomes full, to prevent spillage.

While a specific embodiment of the invention has been shown and described, it is to be understood that numerous changes and modifications may be made therein without departing from the scope and spirit of the invention as set forth in the appended claims.

What we claim is:

1. A method of treating waste-activated sludge contained in waste sludge, paper-pulp sludge, municipal waste sludge, animal or plant waste sludge, containing intra-cellular water molecules contained in molecular cellular units of the waste sludge, comprising:

(a) pumping the waste sludge into a dewatering apparatus for separating waste-activated sludge therefrom;

(b) directing the waste-activated sludge to an electroporating station;

(c) electroporating the waste-activated sludge for destroying at least most of the individual cellular units of the waste-activated sludge in order to release the intra-cellular water molecules contained therein; and said step (c) causing massive disruption of the cellular matter, allowing for the release of bound as well as intra-cellular liquids and intracellular dissolved/organic matter; and (d) directing the released intracellular dissolved/organic matter to an aeration tank for supplying food to bacteria of said aeration tank for performing aerobic digestion thereon whereby the intracellular, dissolved organic matter is used as food for the bacteria of the aeration tank, whereby the aerobic digestion process is accelerated thereby for the same amount of supplied oxygen.

2. The method according to claim 1, wherein said step of electroporating comprises subjecting the waste-activated sludge to an electric field of between 15 KV./cm. and 100 KV./cm.

3. A method of treating waste water comprising:

(a) delivering said waste water to an aerobic bioreactor;

(b) digesting the waste water in said bioreactor, said bioreactor containing bacteria for digesting the waste water by said bacteria to create a waste activated sludge including a plurality of cellular units and bound intracellular dissolved organic matter;

(c) delivering said waste activated sludge to an electroporation apparatus;

(d) electroporating said waste activated sludge in said electroporation apparatus by exposing said waste activated sludge to a pulsed electric field to disrupt said cellular units and to release said bound intracellular dissolved organic matter; and (e) returning said dissolved organic matter to said bioreactor for reaction with said bacteria;

said step (e) comprising supplying said dissolved organic matter as food for bacteria of said bioreactor whereby the bioreactor digestion process is enhanced.

4. The method according to claim 3, further comprising:

(d) at least partially dewatering said waste water prior to said step (c).

5. The method according to claim 3, wherein said step (c) comprises subjecting the waste-activated sludge to an electric field of between 15 KV.cm. and 100 KV/cm.

* * * * *

UNITED STATES PATENT AND TRADEMARK OFFICE
CERTIFICATE OF CORRECTION

PATENT NO. : 6,491,820 B2
DATED : December 10, 2002
INVENTOR(S) : Held et al.

It is certified that error appears in the above-identified patent and that said Letters Patent is hereby corrected as shown below:

<u>Title page,</u>
Item [75], Inventors, please add -- Anthony J. Tomasello, Libertyville, IL --

Signed and Sealed this

Twenty-sixth Day of October, 2004

JON W. DUDAS
*Director of the United States Patent and Trademark Office*